United States Patent
Khuc et al.

(10) Patent No.: US 6,819,759 B1
(45) Date of Patent: Nov. 16, 2004

(54) SYSTEM AND METHOD FOR PROVIDING PERSONALIZED AND CUSTOMIZED SERVICES FOR CALL CENTER CUSTOMERS WAITING IN QUEUE

(75) Inventors: Minh Duy Khuc, Overland Park, KS (US); Carl Milton Coppage, Harrisonville, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/346,757

(22) Filed: Jul. 1, 1999

(51) Int. Cl.[7] ............................................. H04M 3/00
(52) U.S. Cl. ............... 379/309; 379/88.18; 379/265.02; 379/265.09; 379/266.01
(58) Field of Search ......................... 379/67.1, 68, 70, 379/71, 72, 76, 88.06, 88.16, 88.17, 88.18, 88.19, 88.21, 93.12, 93.13, 142.1, 207.03, 207.13, 207.14, 207.15, 210.01, 265.02, 266.01, 266.02, 309

(56) References Cited

U.S. PATENT DOCUMENTS

| | | | | |
|---|---|---|---|---|
| 5,166,974 A | * | 11/1992 | Morganstein et al. ...... | 379/67.1 |
| 5,185,782 A | * | 2/1993 | Srinivasan ............. | 379/210.01 |
| 5,436,967 A | * | 7/1995 | Hanson ................ | 379/210.01 |
| 5,594,791 A | * | 1/1997 | Szlam et al. ........... | 379/265.09 |
| 5,600,710 A | * | 2/1997 | Weisser, Jr. et al. ..... | 379/88.19 |
| 5,627,884 A | * | 5/1997 | Williams et al. ......... | 379/88.16 |
| 5,815,551 A | * | 9/1998 | Katz ....................... | 379/88.19 |
| 6,046,762 A | * | 4/2000 | Sonesh et al. ............ | 348/14.11 |
| 6,088,444 A | * | 7/2000 | Walker et al. ......... | 379/266.02 |
| 6,195,426 B1 | * | 2/2001 | Bolduc et al. ......... | 379/266.01 |
| 6,314,177 B1 | * | 11/2001 | Davis et al. ........... | 379/265.12 |
| 6,400,804 B1 | * | 6/2002 | Bilder ........................ | 379/76 |

OTHER PUBLICATIONS

Kaufman et al, Preference Based Telecommunication Information Service, Aug. 09, 2001, pp. 1–4.*

"www.Quiescent.com," Internet website, Quiescent Telecommunications Corporation, 1999–2000.

* cited by examiner

*Primary Examiner*—Bing Q. Bui

(57) ABSTRACT

For call center calls in queue, a queue system controls the provision of service information based on caller data. Service information such as advertising messages, audio entertainment, and interactive applications based on caller data creates a personalized and customized service for the customer. The queue system receives caller data for the call in the queue. Caller data is data related to the caller such as caller number, called number, and caller entered digits. The queue system then identifies the service information based on the caller data and provides the service information to the call in the queue. The queue system provides numerous advantages such as cost effective advertising, enhanced marketing campaigns targeting specific call center customers, improved customer satisfaction, and reduced rates of call abandonment for calls waiting in the queue.

26 Claims, 6 Drawing Sheets

US 6,819,759 B1

SYSTEM AND METHOD FOR PROVIDING PERSONALIZED AND CUSTOMIZED SERVICES FOR CALL CENTER CUSTOMERS WAITING IN QUEUE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of call processing systems, and in particular, to a system that provides personalized and customized services for call center customers waiting in a queue.

2. Description of the Prior Art

Customers calling call centers typically wait in queues depending on the availability of service agents and/or voice response units. A call is in a queue when the call is waiting and not being processed due to predetermined logic or call center resource unavailability. During this waiting period, call centers play music or pre-recorded messages to prevent the customer from abandoning the call and to take advantage of the waiting period. Some examples of these pre-recorded messages are messages informing the customer their position in the queue and advertising messages. Advertisers who play their messages to queued callers target a general audience of call center customers.

There are two drawbacks with only having the ability to target a general audience of call center customers. First, the advertising is less effective than targeting specific call center customers. Advertising dollars are wasted on queued callers who may not fit the demographic targeted by the marketing campaign. Ineffective advertisement not only wastes advertising dollars but also wastes time for the disinterested caller. In cases where a campaign for new products targets specific call center customers, a service agent identifies if the caller fits within the targeted demographic and then reads a sales pitch or product information from a script. However, this requires a large commitment of the service agents' time to sell products which prevents them from handling what the call was originally made for. Therefore, less customers are served, and call response time increases.

The second drawback is a decreased level of customer satisfaction with messaging for general audiences. Typically, the caller is already displeased with being placed in a queue. Hearing a message that the caller has no interest in can only serve to further annoy the caller. Also, the impression given to the customer is that the customer is only one of many that the call center is trying to serve.

SUMMARY OF THE INVENTION

The invention solves the above problem by providing service information to a call in a queue for a call center based on caller data. The provision of service information such as advertising messages, audio entertainment, and interactive applications based on caller data creates a personalized and customized service for the customer. Initially, the invention receives caller data for the call in the queue for the call center. Caller data is data related to the caller such as caller number, called number, and caller provided information. The invention then identifies the service information based on the caller data and provides the service information to the call in the queue.

Two advantages of the invention are providing the ability to target specific call center customers and providing a new platform of service information for the call in the queue. The first advantage of providing the ability to target specific call center customers is a cost effective advertising solution. Advertising to specific target audiences who are more likely to buy the product or service offered yields a greater return on the advertising dollar. Marketing campaigns can then be enhanced to pinpoint certain customers for new products and services. A customer who previously ordered a breadmaker can hear about the new improved breadmaker model. Other customers not interested in breadmaking will not be burdened with hearing about the new improved breadmaker model. The invention also eliminates the time and cost burdens of having agents identify potential targets for advertising campaigns. Instead, the invention automatically identifies the appropriate advertising message to provide to the call center customer, which frees up service agents from selling new products. Therefore, service agents have more time to serve more customers further reducing call response times.

The second advantage of providing new platforms to the caller waiting in the queue is improved call center customer satisfaction. New advertising messages targeted directly to the customer give the impression that the customer is the only customer that the call center is serving. Also, the new service information such as personalized advertising, caller requested audio entertainment, and interactive caller games keeps the caller entertained and engaged, which reduces the rate of call abandonment.

DETAILED DESCRIPTION OF THE PREFERRED EMBODIMENT

Figure 1:
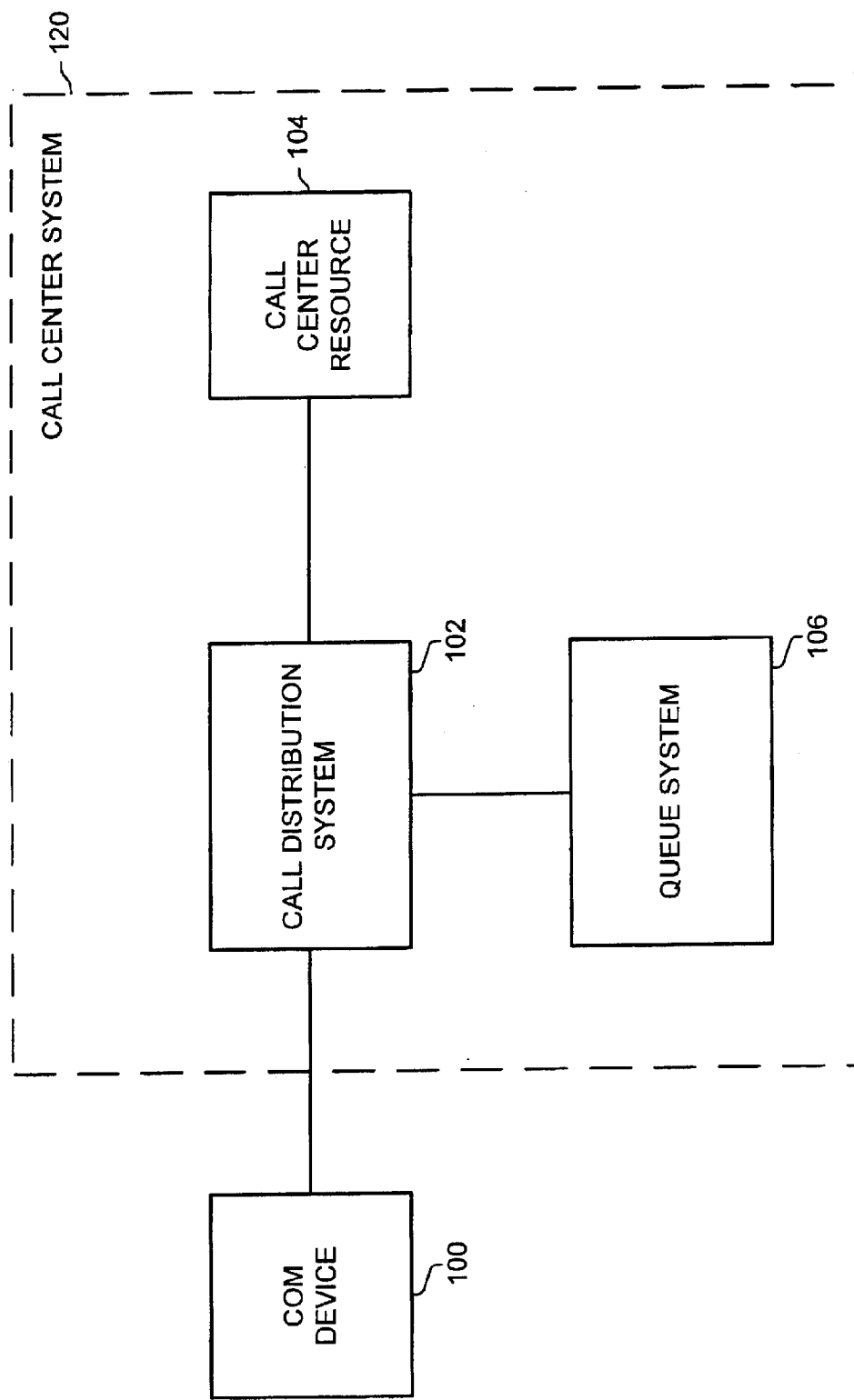
FIG. 1 is a system level block diagram of an example of the invention.
Figure 2:
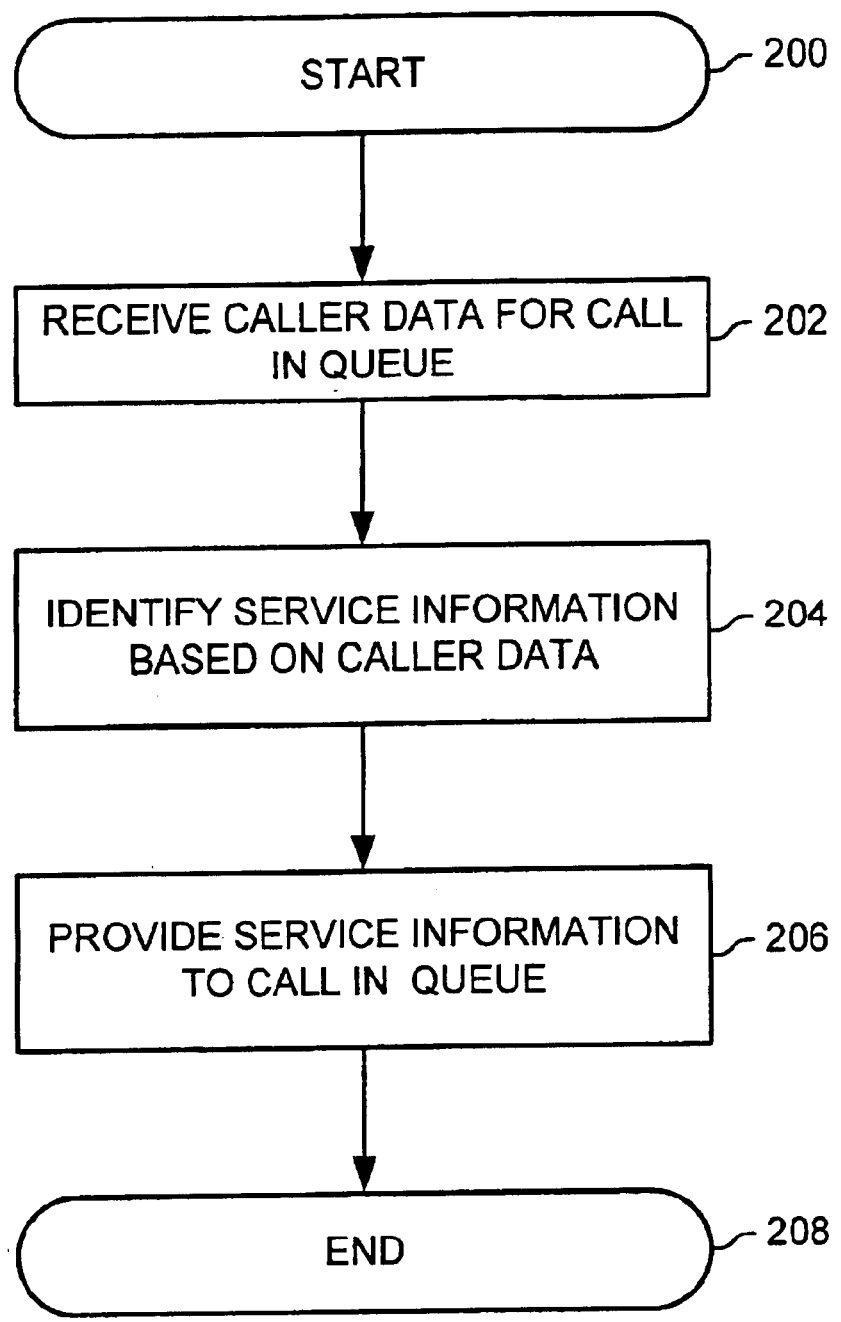
FIG. 2 is a flow chart of a queue system operation in an example of the invention.

Call Center System—FIGS. 1–2

FIG. 1 depicts a system level block diagram of an example of the invention. A call center system 120 is comprised of a call distribution system 102, a call center resource 104, and a queue system 106. A communication device 100 is connected to the call distribution system 102. The call distribution system 102 is connected to the call center resource 104 and the queue system 106.

The communication device 100 could be any device that exchanges calls and caller data with the call distribution system 102. An example of the communication device 100 is a telephone. The call distribution system 102 could be any system that exchanges the calls and the caller data with the communication device 100, transmits the caller data for the call in the queue for the queue system 106, and routes the calls and the caller data to the call center resource 104. The caller data is any data related to the call or caller not limited to a caller number, a called number, time of day, day of the week, specific day in a year, geographic region from which the call originated, area code, queue length, caller provided information, and information digits that specify call characteristics such as pay phone, institution, and hotel/motel. Caller provided information could be any information the caller provides by either caller entered digits or voice recognition. Some examples of caller entered digits are account number, personal identification number (PIN), a social security number, zip code, address, monetary amount, answers to surveys, bar code number, confirmation number, satellite coordinates, credit card number, digital signature, drug code, employee number, flight number, Internet Protocol address number, International Standard Book Number, library card number, license number, lottery number, machine number, network node number, part number, password code, pet identification number, serial number, tax code, tax identification number, vehicle number, and caller entered digits. These examples of caller entered digits may also be captured for caller provided information by voice recognition.

The call is in the queue when the call is waiting and not being processed due to predetermined logic or the unavailability of the call center resource 104. The service information is a communication service or a sequence of communication services that are provided to the calls in the queue. Some examples of the service information are any type of messaging including text-to-speech synthesis, audio entertainment, and interactive applications. These interactive applications could play a game or provide the option to prompt the caller for more information, exit the queue, transfer to another queue or service agent, repeat service information, change languages, conference another caller into the call, leave a recorded message, or leave a phone number for a return call. The service information may also include instructions to repeat messages with a few seconds in between messages or allow customers to stop or switch messages. The service information may provide interaction with the callers by voice recognition or Dual Tone Multi-Frequency.

The queue system 106 could be any system that receives the caller data for the call in the queue from the call distribution system 102, identifies the service information based on the caller data, and provides the service information to the call in the queue for the call distribution system 102. The queue system 106 typically contains the caller data with a relationship to the instruction to provide the service information. For example, the queue system 106 could contain a table with two columns, the caller data and the instruction to provide the service information. In alternative embodiments, the queue system 106 monitors queue time to ensure the service information are delivered in its entirety. The call center resource 104 could be any device or plurality of devices configured to receive calls and caller data from the call distribution system 102. Examples of the call center resource 104 are voice response units and telephones with service agents to answer calls.

In operation, the communication device 100 transmits the call along with the caller data to the call distribution system 102. The call distribution system 102 receives the call and the caller data from the communication device 100. If there is no appropriate call center resource 104 to handle the call, the call distribution system 102 places the call in the queue. In other embodiments of the invention, the call can be placed in the queue due to predetermined logic. The call distribution system 102 then transmits the caller data for the call in the queue for the queue system 106.

FIG. 2 depicts a flow chart of the queue system 106 operation in an example of the invention. FIG. 2 begins at step 200. In step 202, the queue system 106 receives the caller data for the call in the queue from the call distribution system 102. In step 204, the queue system 106 identifies the service information to provide to the call in the queue based on the caller data. In step 206, the queue system 106 provides the identified service information to the call in queue. FIG. 2 ends at step 208.

The service information may be provided by transferring the call to another communication device to provide the service information. For example, the call could be transferred to a voice response unit to play an advertising message. Those skilled in the art will understand how different communication devices can be connected to the call distribution system 102 to provide different types of service information to the call in the queue. Once the call center resource 104 becomes available, the call distribution system 102 routes the call and the caller data to the call center resource 104. Other embodiments of the invention provide the caller the option to remain in the queue to complete the service information transaction. In some embodiments of the invention, the call distribution system 102 routes the call along with the caller data and any associated data from the service information to ensure the same information does not need to be recaptured by the call center resource 104. The caller data and any associated data from the service information may appear on a screen pop to the call center resource 104.

Call Center System Database Architecture—FIGS. 3–6

FIGS. 3–6 disclose one embodiment of the invention, but the invention is not restricted to the configuration provided below. Those skilled in the art will appreciate numerous variations in call center system configuration and operation that are within the scope of the invention. Those skilled in the art will also appreciate how the principles illustrated in this example can be used in other examples of the invention. A particular reference number in one figure refers to the same element in all of the other figures.

Figure 3:
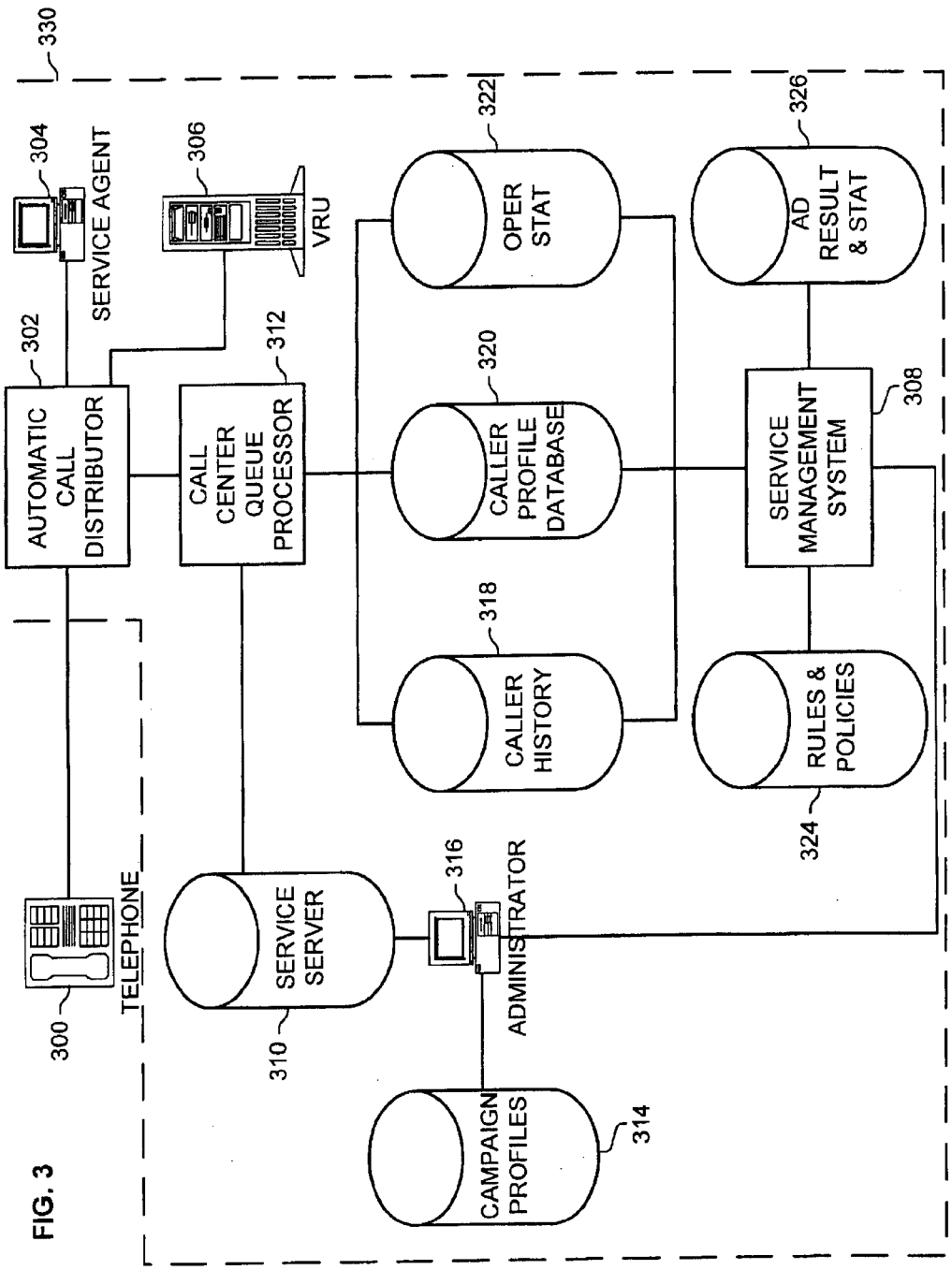
FIG. 3 is a system level block diagram for a system including a database architecture in an example of the invention.

FIG. 3 depicts a system level block diagram for a system including a database architecture in an example of the invention. A call center system 330 is comprised of an automatic call distributor (ACD) 302, a service agent 304, a voice response unit (VRU) 306, a service server 310, a call center queue processor 312, a campaign profile database 314, an administrator 316, a caller history database 318, a caller profile database 320, an operational statistics database 322, a rules and policies database 324, a service management system 308, and an advertising result and statistics database 326. A telephone 300 is connected to the ACD 302. The ACD 302 is coupled to the service agent 304, the VRU 306, and the call center queue processor 312. The call center queue processor 312 is connected to the service server 310, the caller history database 318, the caller profile database 320, and the operational statistics database 322. The service management system 308 is connected to the caller history database 318, the caller profile database 320, the operational statistics database 322, the rules & policies database 324, the advertising result and statistic database 326, and the administrator 316. The administrator 316 is connected to the campaign profiles database 314 and the service server 310.

The service management system 308 represents any system that transmits update instructions for updating the service server 310. Update instructions are instructions for modifying the service server 310 such as updating with new or changed caller data and/or instructions to provide the service information. Other update instructions may be to reassign resources or allow stopgap measures in the service information. The service management system 308 may also retrieve data from the caller history database 318, the caller profile database 320, the operational statistics database 322, the rules and policies database 324, and the advertising result and statistics database 326.

The caller history database 318 represents any database that stores detail of the calls for callers. Some examples of the detail of the call are caller number, dialed number, time of call, call duration, how many times the caller has called, origin of call, reasons for call, items/service ordered, last agent caller spoke with, and identification of call center receiving call. The caller profile database 320 is any database that stores information related to the caller. For example, the caller profile database 320 stores the caller's name, address, and any demographic data such as sex, age, and income level. The operational statistics database 322 represents any database that stores data related to the operation and management of the call center system 330. Data such as the number of callers in queue at a certain date and time, the duration of calls in queue, the rate of call abandonment, and the use of communication resources are stored in the operational statistics database 322. The rules & policies database 324 stores the rules and policies that are used by the service management system 308 to determine what update instructions should take place to update the service server 310. The database in the service server 310 will be generated based on the rules and policies that are stored in the rules & policies database 324. The advertisement result & statistic database 326 is any database that stores the results and statistics of previous advertisement campaigns. The results and statistics may include capture rates, abandon rates, and the amount of sales the automated advertising captured vs. agent interaction. The campaign profile database 314 is any database that stores the profiles and details of campaigns for advertising.

Figure 4:
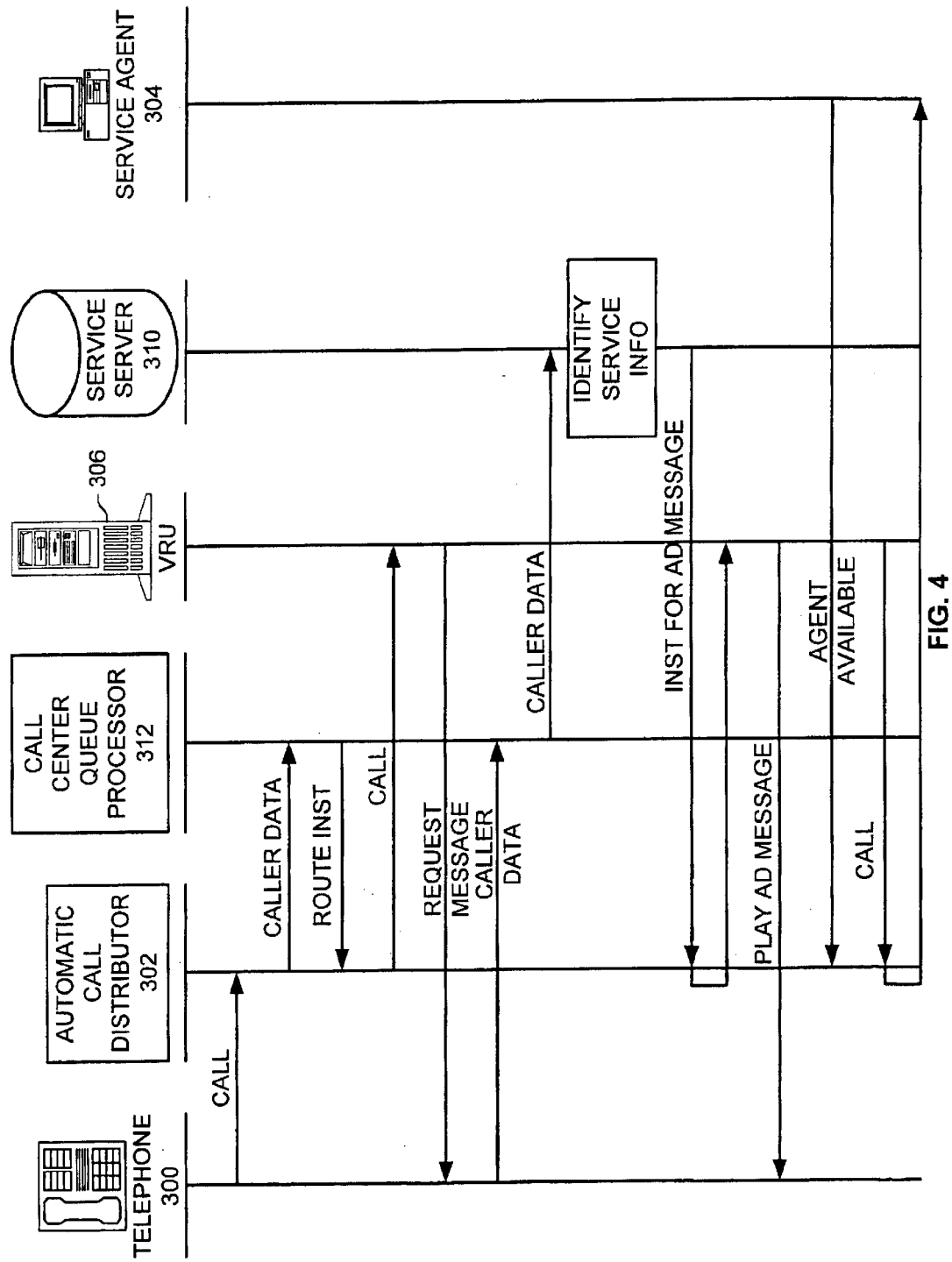
FIG. 4 is a message sequence chart for providing a service information to a call in a queue in an example of the invention.
Figure 5:
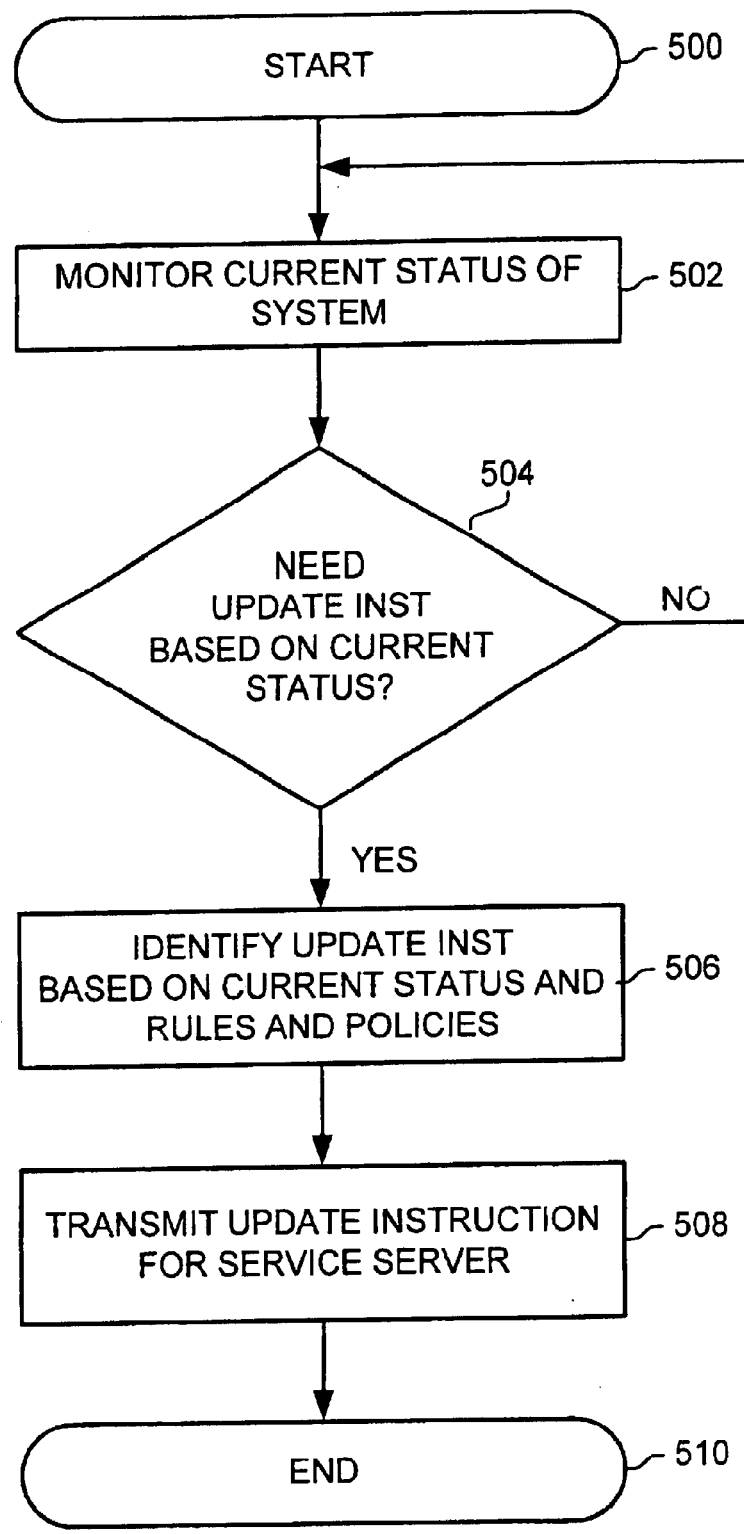
FIG. 5 is a flow chart of a service management system operation in an example of the invention.
Figure 6:
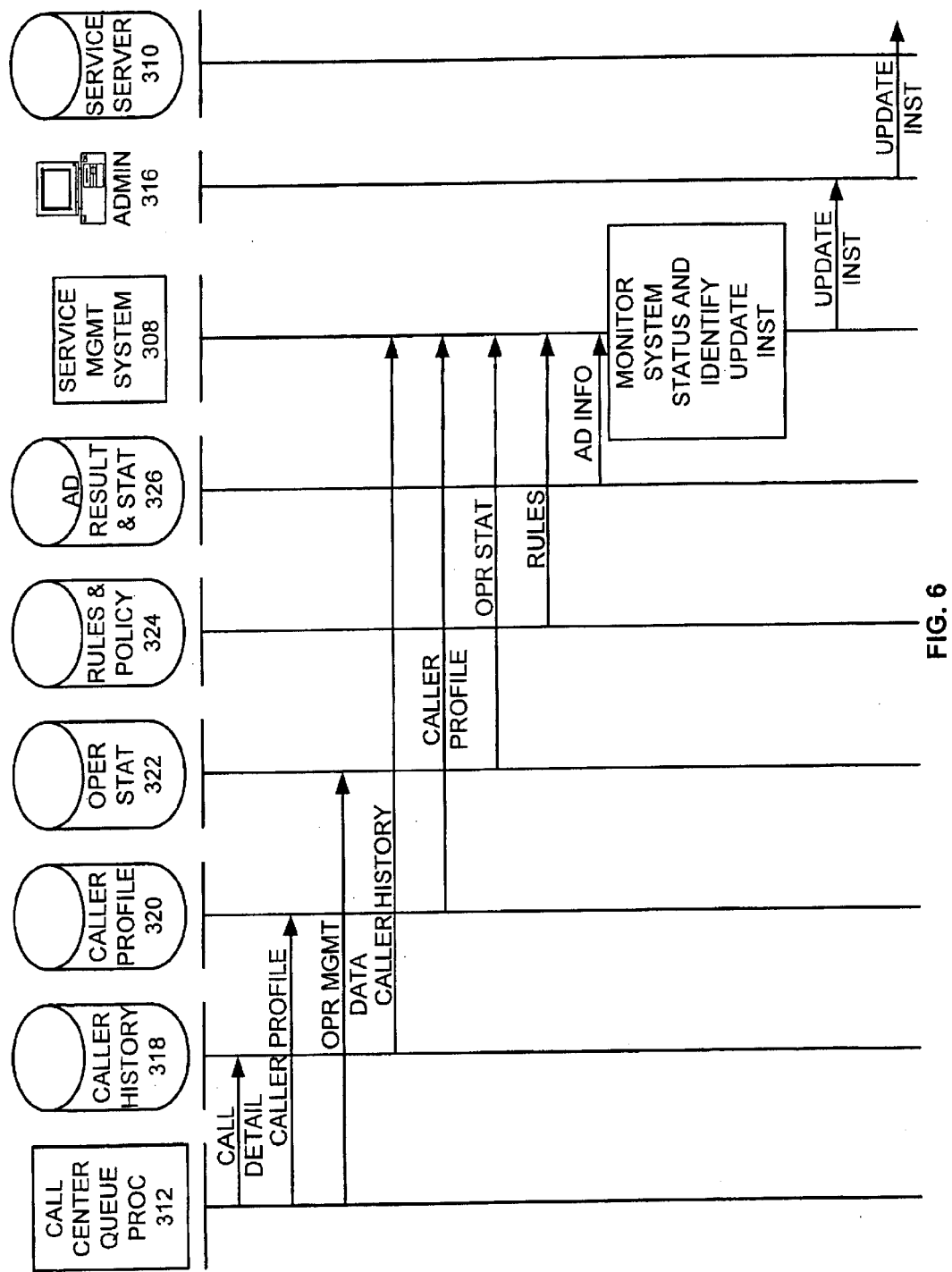
FIG. 6 is a message sequence chart for updating a service server in an example of the invention.

FIGS. 4–6 show the operation of the system including a database architecture in an example of the invention. FIG. 4 depicts a message sequence chart for providing a service information to the call in the queue in an example of the invention. In FIG. 4, the telephone 300 initiates a call to the call center system 330. The telephone 300 transmits the call and the caller data to the ACD 302. If no call center resource, either the service agent 304 or the VRU 306, is available to handle the call, the ACD 302 places the call in the queue. The ACD 302 then transmits caller data for the call in the queue for the call center queue processor 312.

The call center queue processor 312 transmits a routing instruction for the ACD 302 to route the call to the VRU 306 to collect caller provided information for additional caller data. The ACD 302 receives the routing instruction and routes the call to the VRU 306. The VRU 306 receives the call and plays a message requesting the caller to enter digits. In this embodiment of the invention, the caller enters the digits for the caller provided information. In other embodiments of the invention, the caller provided information is collected by voice recognition. The telephone 300 transmits the caller data including the caller provided information for the ACD 302. The ACD 302 transfers the caller data for the call in the queue from the telephone 300 to the call center queue processor 312. The call center queue processor 312 receives the caller data from the ACD 302 and transmits the caller data for the service server 310. The service server 310 receives the caller data for the call in the queue. In response to receiving the caller data, the service server 310 identifies the service information based on the caller data. In this example, the service information provided to the call is an advertising message.

In other embodiments of the invention, the service information could be personalized messages related to the customers' profile. Some examples of personalized messages are messages indicating order status, product information, status of support personnel, upcoming sales, careers, surveys, recommendations for services, expiration status, availability of resources, account status, and account balance. Some examples of product information are product upgrades, features, recalls, and product-related news. One example of a personalized message indicating careers is "We have an opening for a position for people like you that use our XDSL services." Another example of a personalized message indicating status of support personnel is "Joe Smith who served you last time has accepted a promotion into another department—we will try to connect you to another agent with the same background and expertise level." An example of a recommendation for services is "It has been a year since you had your car in for a tune-up." Those skilled in the art will understand the numerous personalized messages related to the customers' profile that can be generated.

The service server 310 transmits an instruction to play the advertising message for the call in the queue for the VRU 306 via the call center queue processor 312 and the ACD 302. The VRU 306 receives the instruction to play the advertising message for the queued call. The VRU 306 processes the instruction and plays the advertising message to the queued call via the ACD 302 and the telephone 300. Once the service agent 304 becomes available, the service agent 304 transmits a signal to the ACD 302 indicating that the service agent 304 is available. After receiving the signal, the ACD 302 terminates the call with the VRU 306. The ACD 302 then routes the call to the available service agent 304.

FIGS. 5–6 depict the operation of the call center system 330 for updating the service server 310. FIG. 5 depicts the flow chart for the service management system 308 in an example of the invention. FIG. 5 begins at step 500. The service management system 308 monitors the current status of the call center system 330 related to the handling of queued calls in step 502. The service management system 308 monitors the current status of the call center system 330 by retrieving data from the caller history database 318, the caller profile database 320, the operational statistics database 322, and the advertising result and statistics database 326 as discussed below in FIG. 6.

In step 504, the service management system 308 determines whether there is a need for any update instructions based on the current status of the call center system 330 and the rules and policies for providing service information. Updates to the service server 310 can occur periodically or on demand when the plans for providing service information to queued calls change. If an update instruction is needed, the service management system 308 identifies the update instruction based on the current status of the call center system 330 and rules and policies for providing service information in step 506. In step 508, the service management system 308 transmits the update instruction for the service server 310. FIG. 5 ends at step 510.

FIG. 6 shows a message sequence chart for updating the service server 310 in an example of the invention. The call center queue processor 312 transmits the call detail information to the caller history database 318. Additionally, the call center queue processor 312 transmits the caller profile information to the caller profile database 320 once the call is completed. The call center queue processor 312 transmits the operational management data to the operational statistics database 320 throughout the operation of the call center system 330.

The service management system 308 monitors the current status of the call center system 330 by retrieving a variety of data from the respective databases. The service management system 308 retrieves the caller history from the caller history database 318. The service management system 308 retrieves the caller profile from the caller profile database 320. The service management system 308 retrieves the operational statistics from the operational statistics database 322. In order to identify if the update instruction is needed, the service management system 308 retrieves the rules and policies for update instructions from the rules and policy database 324. The service management system 308 retrieves data from the advertising results and statistics database 326 to analyze how past advertising campaigns performed. The service management system 308 then identifies what update instructions needs to be taken based on all the information received from the caller history database 308, the caller profile database 320, the operational statistics database 322, the rules and policies database 324, and the advertising result and statistics database 326. Once the update instruction is identified, the service management system 308 transmits an update instruction for the administrator 316. The administrator 316 receives the update instruction and reviews the validity and timing of the update instructions. The administrator 316 may also choose to implement another campaign profile from the campaign profiles database. If approved, the administrator transmits the update instruction for the service server 310. The service server 310 then receives the update instruction and processes the update instruction to update the service server 310.

In other embodiments of the invention, the approval and review process by the administrator 316 is eliminated. Thus, the service server 310 receives the update instruction directly from the service management system 308.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of operating a queue system for handling a call in a queue for a call center, the method comprising:

the queue system receiving caller data for the call in the queue for the call center;

the queue system obtaining a queue length for the queue for the call center;

the queue system selecting an interactive application based on the caller data and the queue length, with the caller data comprising one of a caller account number, a caller personal identification number, a caller zip code, or at least a portion of a caller telephone number;

the queue system providing the interactive application to the call in the queue; and the queue system transferring the call to the call center when the call exits the queue.

2. The method of claim 1 wherein the interactive application comprises a survey.

3. The method of claim 1 wherein the interactive application comprises an account status.

4. The method of claim 1 wherein the interactive application comprises a game.

5. The method of claim 1 wherein the interactive application comprises an option to prompt the caller for caller provided information.

6. The method of claim 1 wherein the interactive application comprises an option to exit the queue.

7. The method of claim 1 wherein the interactive application comprises an option to transfer to another queue.

8. The method of claim 1 wherein the interactive application comprises an option to change the language.

9. The method of claim 1 wherein the interactive application comprises an option to conference another caller into the call.

10. The method of claim 1 wherein the interactive application comprises an option to leave a recorded message.

11. The method of claim 1 wherein the interactive application comprises an option to leave a phone number for a return call.

12. The method of claim 1 further comprising routing the call with caller data to a call center resource.

13. The method of claim 1 further comprising routing the call with associated data from the interactive application to a call center resource.

14. A software product for handling a call in a queue for a call center comprising:

queue system software operational when executed by a processor to direct the processor to receive caller data for the call in the queue for the call center, obtain a queue length for the queue for the call center, select an interactive application based on the caller data and the queue length, with the caller data comprising one of a caller account number, a caller personal identification number, a caller zip code, or at least a portion of a caller telephone number, provide the interactive application to the call in the queue, and transfer the call to the call center when the call exits the queue; and a software storage medium operational to store the queue system software.

15. The call center system of claim 14 wherein the interactive application comprises a survey.

16. The call center system of claim 14 wherein the interactive application comprises an account status.

17. The call center system of claim 14 wherein the interactive application comprises a game.

18. The call center system of claim 14 wherein the interactive application comprises an option to prompt the caller for caller provided information.

19. The call center system of claim 14 wherein the interactive application comprises an option to exit the queue.

20. The call center system of claim 14 wherein the interactive application comprises an option to transfer to another queue.

21. The call center system of claim 14 wherein the interactive application comprises an option to change the language of the service information.

22. The call center system of claim 14 wherein the interactive application comprises an option to conference another caller into the call.

23. The call center system of claim 14 wherein the interactive application comprises an option to leave a recorded message.

24. The call center system of claim 14 wherein the interactive application comprises an option to leave a phone number for a return call.

25. The call center system of claim 14 further comprising a call distribution system configured to route the call with caller data to a call center resource.

26. The call center system of claim 14 further comprising a call distribution system configured to route the call with associated data from the interactive application to a call center resource.

* * * * *